US008232895B2

(12) United States Patent
Kamioka

(10) Patent No.: US 8,232,895 B2
(45) Date of Patent: Jul. 31, 2012

(54) VEHICLE DETECTION APPARATUS, VEHICLE DETECTION PROGRAM AND LIGHT CONTROL APPARATUS

(75) Inventor: Takahiro Kamioka, Kariya (JP)

(73) Assignee: Denso Corporation, Kariya (JP)

( * ) Notice: Subject to any disclaimer, the term of this patent is extended or adjusted under 35 U.S.C. 154(b) by 355 days.

(21) Appl. No.: 12/587,552

(22) Filed: Oct. 8, 2009

(65) Prior Publication Data

US 2010/0091513 A1 Apr. 15, 2010

(30) Foreign Application Priority Data

Oct. 10, 2008 (JP) ................................ 2008-264231

(51) Int. Cl.
*G08G 1/017* (2006.01)

(52) U.S. Cl. ......................................... 340/937; 701/49

(58) Field of Classification Search ................. 340/933, 340/937, 939, 942, 901, 903; 701/49
See application file for complete search history.

(56) References Cited

U.S. PATENT DOCUMENTS

| | | | |
|---|---|---|---|
| 2004/0021853 | A1 | 2/2004 | Stam et al. |
| 2004/0143380 | A1 | 7/2004 | Stam et al. |
| 2004/0164228 | A1 | 8/2004 | Fogg et al. |
| 2004/0201483 | A1 | 10/2004 | Stam et al. |
| 2004/0230358 | A1 | 11/2004 | Stam et al. |
| 2005/0007579 | A1 | 1/2005 | Stam et al. |
| 2005/0036660 | A1 | 2/2005 | Otsuka et al. |
| 2005/0041313 | A1 | 2/2005 | Stam et al. |
| 2006/0177098 | A1 | 8/2006 | Stam |
| 2007/0023660 | A1 | 2/2007 | Seger et al. |
| 2008/0024325 | A1 | 1/2008 | Kobayashi et al. |
| 2008/0128599 | A1 | 6/2008 | Stam et al. |
| 2008/0180528 | A1 | 7/2008 | Saito |
| 2008/0278577 | A1 | 11/2008 | Otsuka et al. |

FOREIGN PATENT DOCUMENTS

| | | |
|---|---|---|
| JP | 07-002015 | 1/1995 |
| JP | 2002-008017 | 1/2002 |
| JP | 2004-341801 | 12/2004 |
| JP | 2005-092857 | 4/2005 |
| JP | 2005-092861 | 4/2005 |
| JP | 2005-534903 | 11/2005 |
| JP | 2006-511383 | 4/2006 |
| JP | 2006-515130 | 5/2006 |
| JP | 2006-521043 | 9/2006 |
| JP | 2007-076428 | 3/2007 |
| JP | 2007-076429 | 3/2007 |
| JP | 2008-33676 | 2/2008 |
| JP | 2008-068700 | 3/2008 |
| JP | 2008-186344 | 8/2008 |

OTHER PUBLICATIONS

Office action dated Aug. 10, 2010 in corresponding Japanese Application No. 2008-264231.
Office action dated Nov. 9, 2010 in corresponding Japanese Application No. 2008-264231.

*Primary Examiner* — Thomas Mullen
(74) *Attorney, Agent, or Firm* — Harness, Dickey & Pierce, PLC

(57) ABSTRACT

A vehicle detection apparatus detects oncoming vehicles, and the illumination angle of the headlight is changed downwardly when oncoming vehicles are detected. When detecting the oncoming vehicles, the vehicle detection apparatus detects brightness or area for the every light source in an acquired image repeatedly, and detects as a variable light source any light source of which brightness or area changes within a reference time beyond a predetermined variation reference value. Then, when a variable light source is detected, it is determined that vehicles exist in the acquired image.

6 Claims, 8 Drawing Sheets

VEHICLE DETECTION APPARATUS, VEHICLE DETECTION PROGRAM AND LIGHT CONTROL APPARATUS

CROSS-REFERENCE TO RELATED APPLICATION

This application is based on and claims the benefit of priority from earlier Japanese Patent Application No. 2008-264231 filed Oct. 10, 2008, the description of which is incorporated herein by reference.

BACKGROUND OF THE INVENTION

1. Technical Field of the Invention

The present application relates to a vehicle detection apparatus that detects vehicles during the hours of darkness, and to a vehicle detection program and a light control apparatus.

2. Related Art

Vehicle detection apparatuses have been known, which detect vehicles during the hours of darkness. A type of such a vehicle detection apparatus analyzes the absolute value of the brightness of a light source. Another type of such a vehicle detection apparatus analyzes the wavelength of the light emitted from a light source. Both of these types of vehicle detection apparatus can discriminate light originating from the headlights of a vehicle from light originating from an object other than vehicles. For example, such vehicle detection apparatuses are disclosed in Japanese Patent Application Laid-Open Publication Nos. 2005-092857 and 2005-534903.

However, in a vehicle detection apparatus utilizing the absolute value of the brightness of a light source, the brightness of the headlights of a vehicle may coincide with the brightness of light originating from an object other than vehicles. Thus, this type of detection apparatus has suffered from a problem that, if such coincidence occurs, a detection error may be caused, that is, light originating from an object other than vehicles may be determined as being originated from a vehicle.

Further, coincidence may also occur in a vehicle detection apparatus utilizing the wavelength of the light emitted from a light source, when it discriminates whether or not the light source is originated from a vehicle. Specifically, in such a vehicle detection apparatus, the wavelength of the reflection of the light emitted from the headlights of a vehicle may coincide with the wavelength of the light emitted from the headlights, per se. Thus, this type of vehicle detection apparatus has also suffered from a problem of causing a detection error at the occurrence of such coincidence.

SUMMARY OF THE INVENTION

In light of the problems mentioned above, the present invention has an object of providing a technique that enables accurate detection of vehicles during the hours of darkness.

In a vehicle detection apparatus according to a first aspect, the vehicle detection apparatus that detects vehicles during the hours of darkness comprises an acquisition means that acquires an acquired image repeatedly by an image acquisition means that picks up an image of a road, a light source detection means that detects a light source which is an order of magnitude more than a standard brightness during each image acquisition, a variation detecting means that detects brightness or area for the every light source repeatedly, and detects any variable light sources, that is light sources of which the brightness or area is changed within a reference time beyond a predetermined variation reference value, and a determining means that determines that vehicles exist in the acquired image when the variable light source is detected by the variation detecting means.

Vehicle headlights in general include a light-shielding member that partially shields light emitted from the headlights, in order to prevent dazzling of the driver of an oncoming vehicle that travels from the opposite direction.

The boundary between the light-shielded region shielded by the light-shielding member and the illuminated region not light-shielded by the light-shielding member is called a "cutline". The cutline is set so that the eyes of an oncoming vehicle's driver will not be directly illuminated. However, during traveling, a vehicle may rock due to the roughness of the road, and with the rock motion, the cutline is vertically shifted. In this case, the viewpoint of the oncoming vehicle's driver frequently falls in the illuminated region of the rocking vehicle on the rough road.

In this regard, the present invention is adapted to detect drastic variation in the brightness of a light source (variable light source) in acquired images, under the conditions where the oncoming vehicle driver's viewpoint variably falls either in the light-shielded region or the illuminated region with reference to the level at which the image acquisition means is located. It is considered that many roadside objects, such as street lamps and signboards have light sources with substantially constant brightness, and that these roadside objects cannot be variable light sources. For this reason, the present invention is adapted to determine a variable light source as being a vehicle.

Also, it is considered that the variation in the brightness of a light source may lead to the variation in the size of the light source detected in the acquired images. In particular, as a light source becomes brighter, its apparent size will become larger in the acquired images. On the other hand, as a light source becomes darker, its size will become smaller in the acquired images. Accordingly, it is considered that a vehicle can be similarly determined to be present by providing a configuration in which variation in the area of a light source is detected instead of variation in the brightness of a light source.

Thus, such a vehicle detection apparatus is able to discriminate between light originating from a vehicle and light originating from an object other than vehicles, whereby appropriate vehicle detection can be conducted. It should be appreciated that the "brightness" referred to in the present specification may be detected by detecting luminance or illumination.

In the vehicle detection apparatus according to a second aspect, the variation detecting means detects the light source as variable light source when the brightness or area increases more than a threshold within a reference time, and then the brightness or area decreases thereafter.

Such a vehicle detection apparatus can exclude light sources having periodically varying brightness or area, which is originated from an object other than vehicles, and can determine only the light source whose brightness or area has instantly increased due to the bumpy movement of a vehicle, as being originated from a vehicle. Accordingly, the accuracy of detecting vehicles can be enhanced.

The variation detecting means may be adapted to detect a light source whose brightness or area has increased and then substantially decreased thereafter to the brightness or area before the increase. The term "substantially" here is used based on the consideration that the brightness or area may increase in the acquired images, due to the forward movement of the vehicle in question between pre- and post-variation of the brightness or area.

In the vehicle detection apparatus according to a third aspect, the variation detecting means specifies the brightness of each pixel that constitutes the acquired image, and is configured so that the brightness of the light source is calculated using the brightness of each pixel, when the variation detecting means specifies the brightness of the each pixel, the brightness of a specific pixel is specified in consideration of the brightness of the specific pixel itself that is to be specified its brightness, and the brightness of the adjacent pixels that is a plurality of pixels adjoining the specific pixel.

With such a vehicle detection apparatus, the brightness of the specific pixel is specified taking into account of the brightness of the plurality of pixels including the plurality of adjacent pixels. Accordingly, the brightness of the light source can be accurately detected even when an imaged small light source is located over a plurality of pixels. In other words, the brightness of the light source located in the distance from the image acquisition means can be accurately detected.

In specifying the brightness of the specific pixel, such schemes may be used, for example, as averaging the brightness of the specific pixel, per se, and the brightness of the adjacent pixels, or of multiplying a predetermined coefficient with the brightness of each of the adjacent pixels and with the brightness of the specific pixel, followed by summing up the multiplied values (in this case, the coefficient to be multiplied with the brightness of each of the adjacent pixels may be smaller than the coefficient to be multiplied with the brightness of the specific pixel). Also, in the case where the brightness of a light source is specified based on the brightness of the individual pixels, average brightness of the individual pixels or the maximum brightness among the individual pixels, for example, may be used as the brightness of the light source.

In the vehicle detection apparatus according to a fourth aspect, the determining means counts the number of times that variability is detected for the same light source, and determines that the vehicle exists only when the number of times variability is detected is more than a threshold.

With such a vehicle detection apparatus, a variable light source can be determined as being originated from a vehicle in the case where the number of times of detection of the light source is equal to or more than the threshold. Accordingly, those light sources, whose brightness has happened to vary only once, can be prevented from being erroneously determined as being originated from vehicles.

In the vehicle detection apparatus according to a fifth aspect, the determining means measures intervals between when variability is detected for the same light source, and determines that the light source concerned is not a vehicle if the intervals between detections are periodic.

With such a vehicle detection apparatus, those light sources, such as rotating lamps, flicker signals and search lights, whose brightness periodically changes, can be excluded as not being originated from vehicles. Accordingly, the accuracy of detecting vehicles can be enhanced.

In the vehicle detection apparatus according to a sixth aspect, there is provided a program for configuring a computer to provide each means of the vehicle detection apparatus.

With such a vehicle detection program, advantages similar to at least the invention recited in the first aspect can be enjoyed.

In the vehicle detection apparatus according to a seventh aspect, there is provided a light control apparatus equipped in the vehicle that controls an optical axis of headlights in the vehicles having a vehicle detection means that detects oncoming vehicles that face the vehicle concerned, and a changing means that changes an illumination angle of the headlight downward when the oncoming vehicles are detected by the vehicles detection means, wherein, the vehicle detection means is the light control apparatus constituted as the vehicle detection apparatus.

Such a light control apparatus is able to discriminate between light originating from a vehicle and light originating from an object other than vehicles, whereby vehicles can be appropriately detected. Also, when a vehicle has been detected, the direction of the headlights can be changed downward to restrict the illumination range.

DETAILED DESCRIPTION OF THE PREFERRED EMBODIMENTS

With reference to the accompanying drawings, hereinafter will be described an embodiment of the present invention.

[Configuration of the Present Embodiment]

Figure 1:
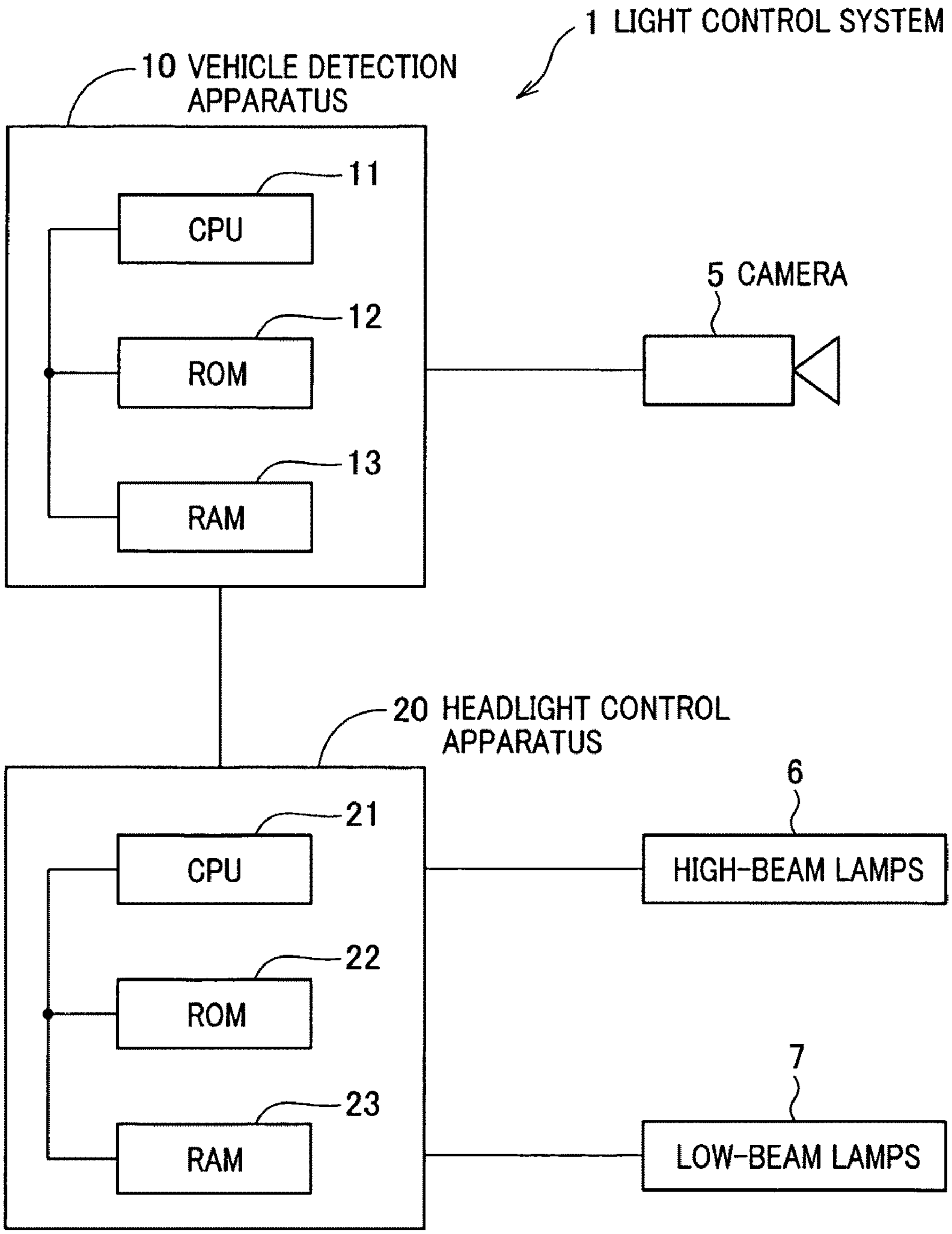
FIG. 1 shows a schematic block diagram illustrating a light control system in which the present invention is applied.

FIG. 1 is a schematic block diagram illustrating a light control system 1 to which the present invention is applied. The light control system 1 is equipped on a vehicle, such as a passenger car, (hereinafter referred to as "the system-equipped vehicle" or "the vehicle"). The light control system 1 has a function of controlling the illumination range of the headlights of the system-equipped vehicle 100 (see FIG. 2).

As shown in FIG. 1, the light control system 1 includes a camera 5 (image acquisition means), a vehicle detection apparatus 10 and a headlight control apparatus 20. The camera 5 picks up images of the road frontward of the vehicle 100. The vehicle detection apparatus 10 detects an oncoming vehicle that travels from the opposite direction of the vehicle 100, from the images picked up by the camera 5. The headlight control apparatus 20 operates ("switches ON/OFF" in the present embodiment) high-beam lamps 6 and low-beam lamps 7. The high-beam lamps 6 are the lamps (high beams) used when the vehicle 100 travels on a road and have an illumination range of up to about 100 m forward of the vehicle 100. The low-beam lamps 7 are the lamps (low beams) used when the vehicle 100 comes across other vehicles and have an illumination range of up to about 40 m forward of the vehicle 100.

The vehicle detection apparatus 10 has a configuration that includes a known microcomputer, which is provided with a CPU 11, a ROM 12, a RAM 13, and the like. The CPU 11 executes various processes, such as a light control process that will be described later, based on a program, such as a vehicle detection program, stored in the ROM 12. Also, the vehicle detection apparatus 10 (CPU 11) transmits to the headlight control apparatus 20 a command signal for changing the direction of the optical axis (including a command signal for switching ON/OFF the high-beam lamps 6).

The headlight control apparatus 20 has a configuration that includes a known microcomputer, which is provided with a CPU 21, a ROM 22, a RAM 23, and the like. Upon reception of a command signal from the vehicle detection apparatus 10, the CPU 21 controls the direction of the optical axis of the low-beam lamps 7, or controls switch-ON/OFF of the high-beam lamps 6, based on the program stored in the ROM 22. In other words, the CPU 21 effects control of changing the illumination range of the headlights.

Figure 2:
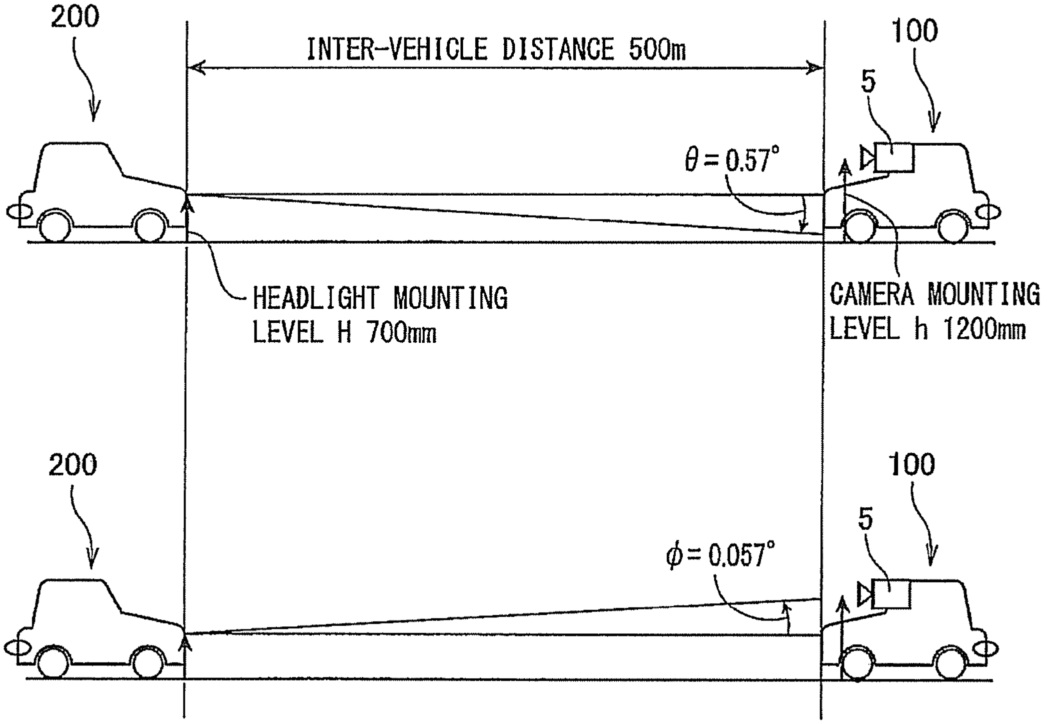
FIG. 2 shows an explanatory view illustrating a positional relationship between a vehicle equipped with the light control system and an oncoming vehicle.

In the present embodiment, description is omitted as to the process and the mechanism of controlling the direction of the optical axis of the low-beam lamps 7. The following description is focused on the process of controlling the switch-ON/OFF of the high-beam lamps 6 and the low-beam lamps 7. FIG. 2 is an explanatory view illustrating a positional relationship between the vehicle 100 and an oncoming vehicle 200.

In FIG. 2, a mounting height "H" of the headlights of the oncoming vehicle 200 is 700 mm, an inter-vehicle distance between the system-equipped vehicle 100 and the oncoming vehicle 200 is 500 m, and a mounting height "h" of the camera 5 in the vehicle 100 is 1200 mm.

Vehicles in general, including the vehicle 100 and the oncoming vehicle 200, have headlights (low beams) each of which is provided with a light-shielding member that partially shields light emitted from the headlights, in order to prevent it from dazzling the driver of the oncoming vehicle that travels from the opposite direction.

The boundary between the light-shielded region shielded by the light-shielding member and the illuminated region not light-shielded by the light-shielding member is called a "cutline". The cutline is set so that the viewpoint of an oncoming vehicle's driver will not fall in the illuminated region. To describe in detail, we assume that there is an imaginary plane that is inclined downward by 1% with respect to the horizontal direction as viewed from the set level of the headlights. The cutline is set so that the region below the imaginary plane serves as the illuminated region of the headlights and the region above the imaginary plane serves as the light-shielded region. The inclination, when expressed in terms of an angle θ, will be 0.57°.

When the inter-vehicle distance is 500 m, an elevation angle ψ from the mounting level (H=700 mm) of the headlights to the mounting level (h=1200 m) of the camera will be 0.057° for the oncoming vehicle 200. In this case, when a pitch angle of the oncoming vehicle 200 exceeds 0.627°, which is the sum of the angles θ and ψ, the level of the cutline will be higher than the mounting level of the camera. As a result, the camera 5 will be included in the illuminated region. It should be appreciated that the pitch angle refers to an inclination angle in the longitudinal direction of the vehicle with respect to the horizontal direction. In the following description, the inclination in the case where the vehicle front height becomes higher than the rear vehicle height is expressed by a positive value.

Figure 3A:
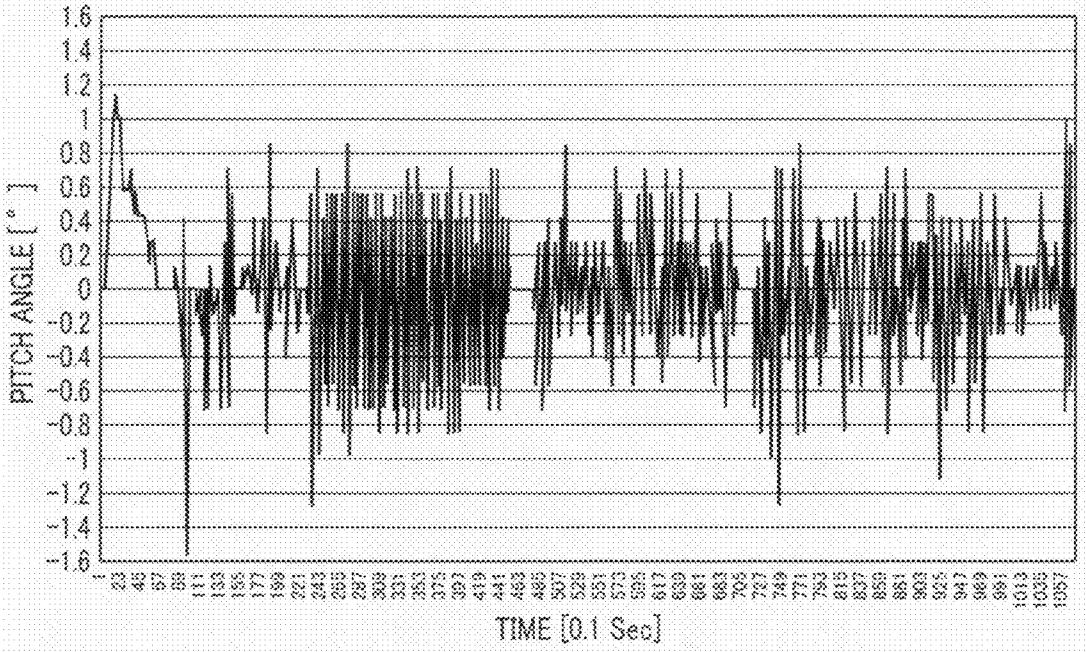
FIG. 3A shows a graph indicating pitch angle variation during traveling of a vehicle.

FIG. 3A is a graph indicating pitch angle variation of a vehicle during traveling. However, the data shown in FIG. 3A is the pitch angle variation obtained under the conditions where a test vehicle is started on a normally paved road, and allowed to run at a constant speed after reaching the speed of 30 km per hour. It should be appreciated that the period from the start of data measurement up to the expiration of seven seconds includes the pitch angle variation caused by the acceleration.

As is apparent from FIG. 3A, the pitch angle frequently and irregularly exceeds 0.07°. It is predictable that, with the acceleration of the vehicle, the pitch angle will be increased.

Figure 3B:
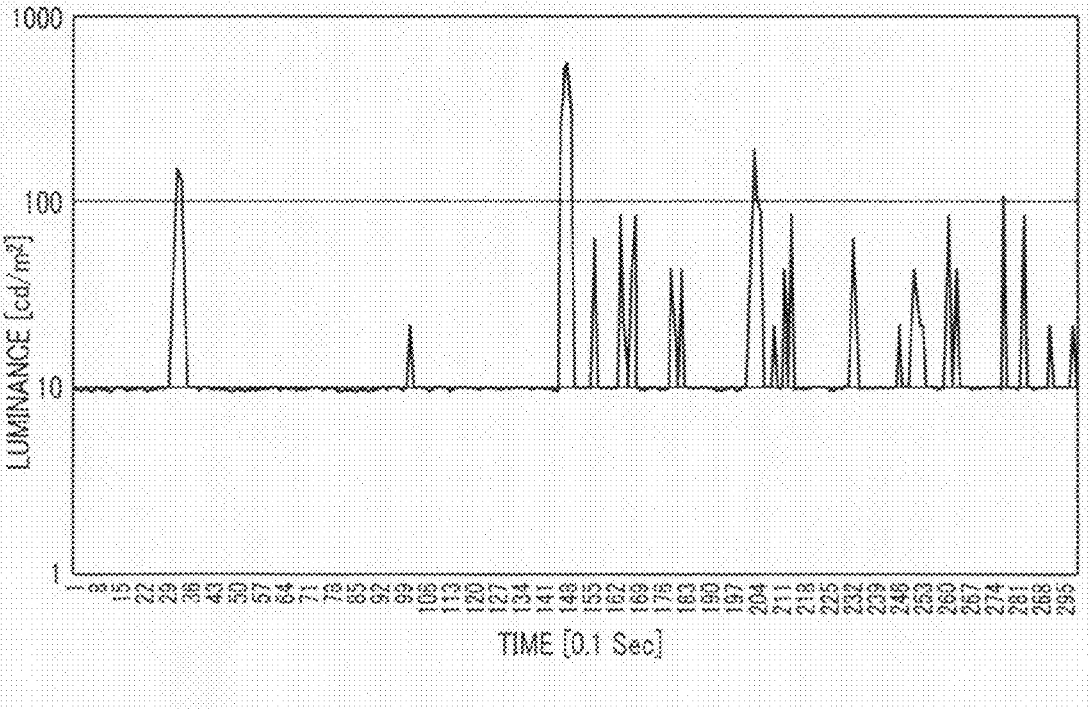
FIG. 3B shows a graph indicating luminance value variation of the headlights of the oncoming vehicle, in the images of the headlights picked up by a camera in the light control system.

FIG. 3B is a graph indicating luminance value variation of the headlights of the oncoming vehicle 200 in the images thereof picked up by the camera 5. The data shown in FIG. 3B is the luminance value variation obtained under the conditions where the oncoming vehicle 200 is allowed to approach the vehicle 100 at a speed of 30 km per hour on a normally paved road from the state where the inter-vehicle distance between the vehicle 100 and the oncoming vehicle 200 is 1800 m.

As shown in FIG. 3B, the luminance value of the headlights in the acquired images in the forward movement of the oncoming vehicle 200 frequently varies by a factor of equal to or higher than three (the luminance value varies from about 10 $cd/m^2$ to 30 $cd/m^2$ or more), and immediately after the variation, is restored to substantially the original value. As can be seen from FIGS. 3A and 3B, the pitch angle variation of the oncoming vehicle 200 leads to the variation in the luminance value of the headlights in the images picked up by the camera 5 of the vehicle 100.

Figure 4A:
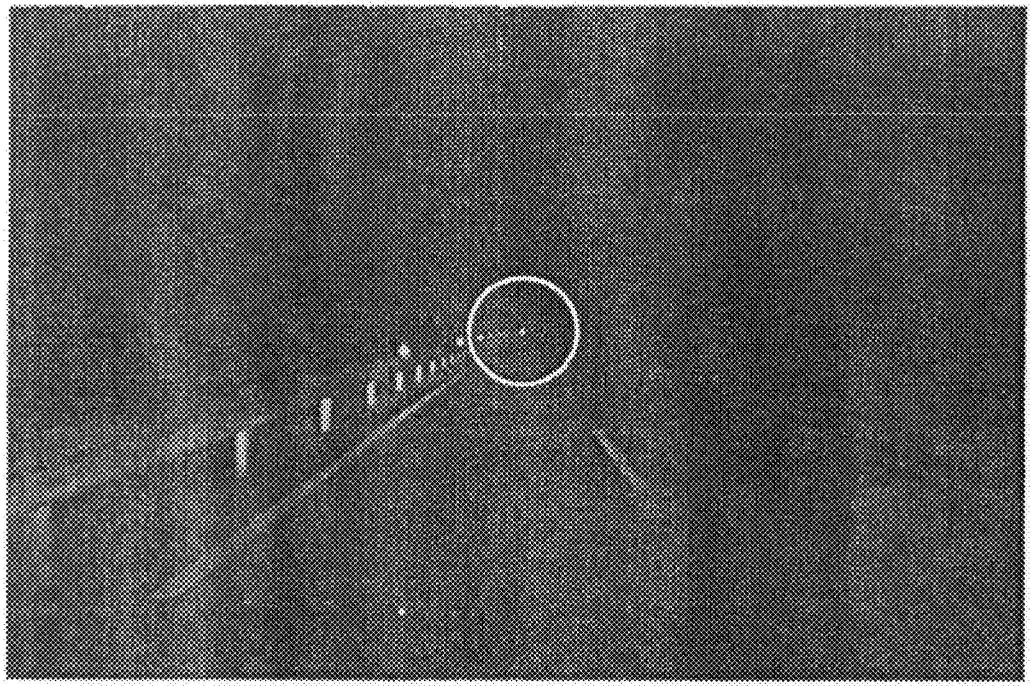
FIGS. 4A and 4B show explanatory views showing specific examples of variations in the brightness and the area of a light source in the acquired images.
Figure 4B:
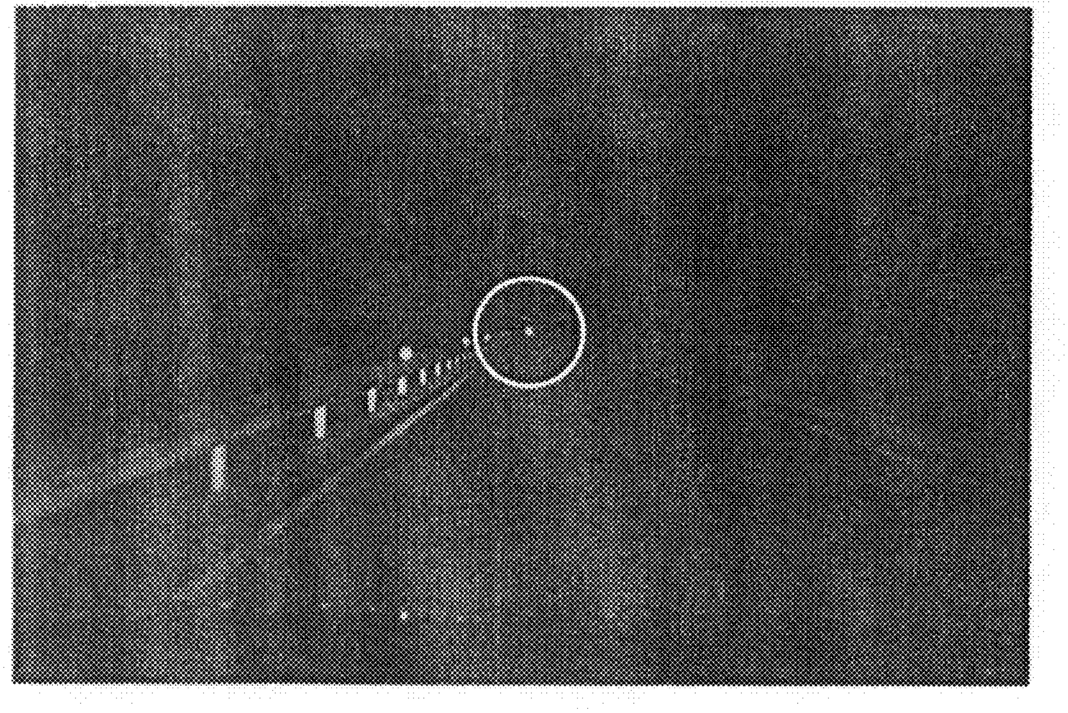

Specifically, as indicated at the center of the white circle region of FIG. 4A, when the pitch angle of the oncoming vehicle 200 is small, the luminance value of the light source, i.e. the headlights, is small, and the area of the light source in the acquired image is also small. On the other hand, as indicated at the center of the white circle region of FIG. 4B, when the pitch angle of the oncoming vehicle 200 becomes large, the luminance value of the light source becomes large, and the area of the light source in the acquired image also becomes large.

[Process Performed in the Present Embodiment]

Figure 5:
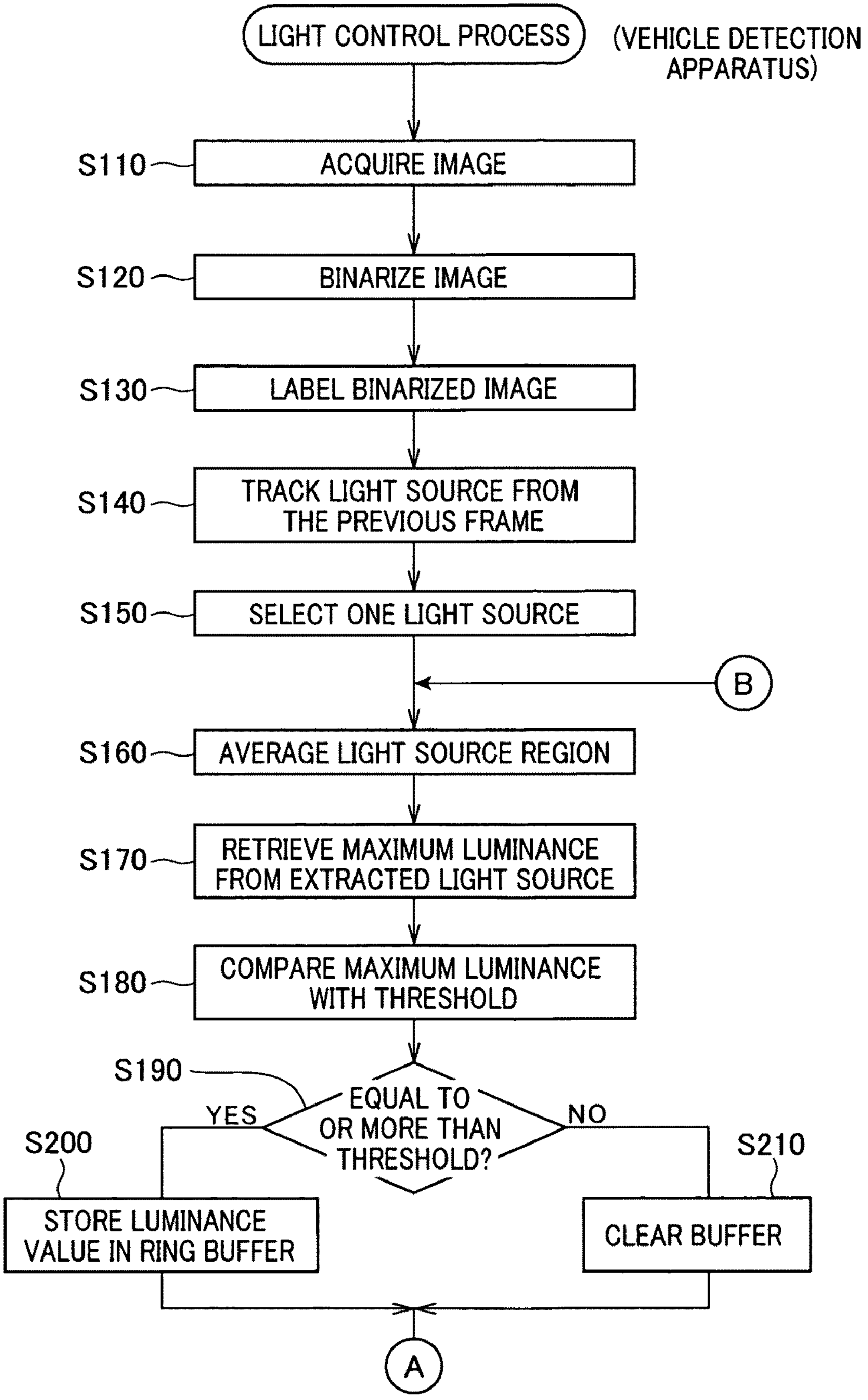
FIG. 5 shows a flow diagram (first half) illustrating a light control process performed in an embodiment of the present invention.
Figure 6:
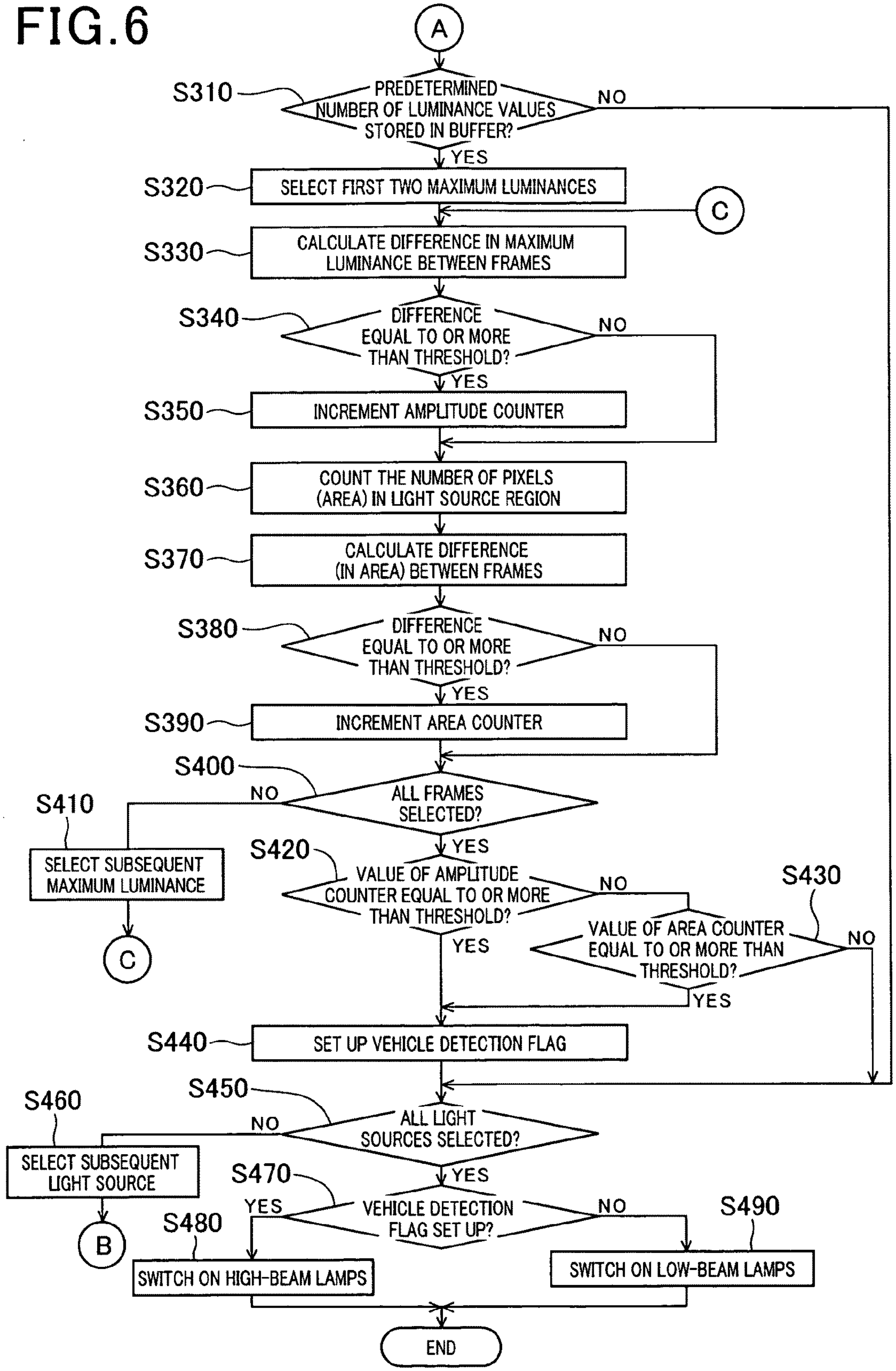
FIG. 6 shows a flow diagram (latter half) illustrating the light control process performed in the embodiment of the present invention.

There is a characteristic that, when the pitch angle of the oncoming vehicle 200 has become large, the luminance value of the light source and the area of the light source in the acquired images become large. The present embodiment utilizes this characteristic to perform a process of discriminating between light originating from a vehicle (headlights) and light originating from an object other than vehicles. FIGS. 5 and 6 are flow diagrams illustrating a light control process performed by the vehicle detection apparatus 10.

In the light control process of the present embodiment, the process at S110 corresponds to the acquiring means, and the processes at S120 and S130 correspond to the light source detecting means of the present invention. Also, the processes at S160, S170, S330, S340, S370 and S380 correspond to the variation detecting means, and the processes at S420 to S440 correspond to the determining means of the present invention.

The light control process is a process started with the switch-ON of the power source, such as an ignition switch, not shown, of a vehicle, and activated thereafter at every periodic image pickup time (e.g., every 1/30 secs.) of the camera 5.

It should be appreciated that an amplitude counter and an area counter, which will be described later, are to be cleared at the start of the light control process. Specifically, in the light control process, an image picked up by the camera 5 is acquired first as shown in FIG. 5 (S110).

Then, binarization is performed in the acquired image with the brightness that serves as a reference brightness (S120), followed by extracting light sources, i.e. those regions which have brightness equal to or more than the reference brightness, and labeling the individual light sources (S130). The "reference brightness" here refers to a threshold that distinguishes a dark region from other regions than the dark region.

Then, the extracted light sources are correlated with the respective light sources extracted in the previous and the preceding image pickup performances (previous frames) (S140). This process is carried out in order to enable keeping track of the brightness, the area, or the like, of each of the light sources.

Figure 7A:
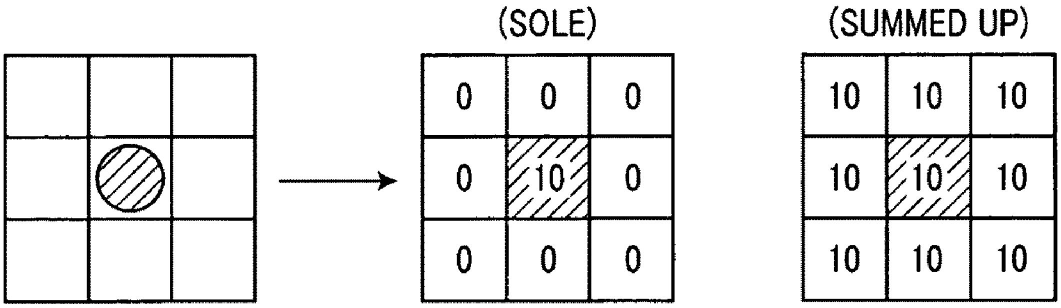
FIGS. 7A and 7B show explanatory views each illustrating a plurality of imaging elements within the camera, and a model of a light source detected by these imaging elements.
Figure 7B:
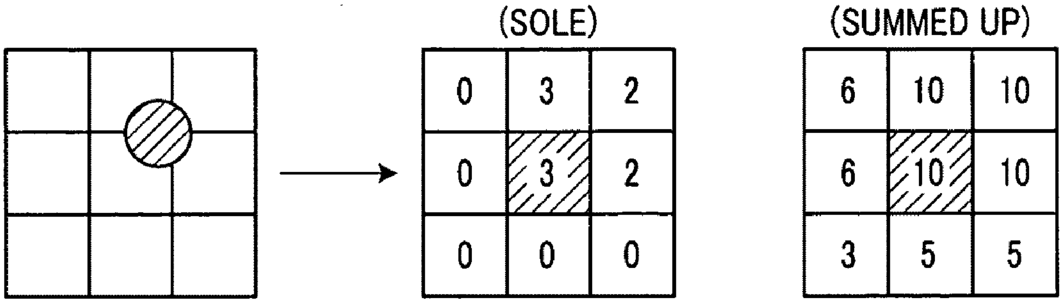

Then, one from the extracted light sources is selected (S150), and the luminance in the light source region is averaged (S160). This process is the process of correcting the luminance values of the pixels configuring the acquired image, in order to correctly detect the luminance of the light source. The details will be described referring to FIGS. 7A and 7B. FIGS. 7A and 7B are explanatory views each illustrating a plurality of imaging elements configuring the camera 5 and a model of the light source detected by the imaging elements. In each of the diagrams of FIGS. 7A and 7B, a portion (nine pixels) of a number of imaging elements in the camera 5 is illustrated in a grid pattern.

When the oncoming vehicle 200 is in the distance, for example, the size of the light source at the time of being picked up by the camera 5 may be considerably small. In such a case, the light source may be detected in the state of being located in one imaging element as shown in the left diagram of FIG. 7A, or may be detected in the state of being located over a plurality of imaging elements as shown in the left diagram of FIG. 7B. Let us study here the output of the center imaging element shown in each of these diagrams in the case where the brightness of the light source is "10". When the light source is detected in the state of being located in one imaging element, the output of the center imaging element will be "10" as shown in the middle diagram of FIG. 7A. On the other hand, when the light source is detected in the state of being located over a plurality of imaging elements, the output of the center imaging element will be less than "10". For example, the output will be "3" as shown in the middle diagram of FIG. 7B.

In other words, as can be seen, it is likely that, when the size of a light source is considerably small, the luminance of the light source cannot be correctly detected with a configuration which is adapted to detect the luminance of a light source merely based on the output from the imaging elements.

In this regard, in detecting the luminance of a light source in the pixels in the present embodiment, the luminance of the light source is ensured to be detected considering not only the output from the imaging element alone corresponding to the pixel (the specific pixel), but also the output from the surrounding imaging elements. Specifically, a value obtained by adding the luminance values of the surrounding eight pixels to the luminance value of the specific pixel, for which the luminance value is to be specified, is newly provided as the luminance value of the specific pixel.

This luminance value may be divided by the number of pixels involved in the addition so that the mean value can be used as a luminance value. Alternatively, each of the luminance values may be ensured to be multiplied with a predetermined coefficient, followed by addition of the multiplied values.

According to these schemes, as shown in the right diagram in each of FIGS. 7A and 7B, substantially the same output value ("10" here) can be obtained in both of the cases where the light source is detected in the state of being located in one imaging element and the where the light source is detected in the state of being located over a plurality of imaging elements. It should be appreciated that the process described below uses the luminance value obtained through the scheme shown in FIGS. 7A and 7B.

Referring to FIG. 5 again, the luminance value of the brightest pixel, i.e. the maximum luminance, is retrieved from the region of the light source (the plurality of pixels configuring the light source) selected at S150 (S170), and the maximum luminance is compared with a threshold (S180). The threshold here refers to a threshold for determining the probability that the light source is originated from the headlights of a vehicle, and thus is a value corresponding to the brightness slightly higher than the "reference brightness" mentioned above.

If the maximum luminance is equal to or more than the threshold (YES at S190), the luminance value is recorded in a ring buffer, a part of the RAM 13, as the luminance value of the light source (S200). On the other hand, if the maximum luminance is less than the threshold (NO at S190), the ring buffer is cleared (S210).

Subsequently, as shown in FIG. 6, it is determined whether or not a predetermined number of luminance values associated with the light source are stored in the ring buffer (S310). It should be appreciated that the term "predetermined number" refers to the number of frames that are sufficient for recognizing the variation in the values of the maximum luminance, or the variation in the area of the light source.

If the predetermined number of luminance values is not stored (NO at S310), control is transferred to S450 at which a process that will be described later is performed. If the predetermined number of luminance values is stored (YES at S310), two maximum luminances, i.e. the initially recorded maximum luminance and the subsequently recorded maximum luminance, are selected (S320). It should be appreciated that, in this process, any two frames may be selected so that an appropriate time interval may be ensured between measurement times of the two maximum luminances.

Then, the difference between the maximum luminances of the two frames is calculated (S330) to determine whether or not the difference is equal to or more than a threshold (S340). The threshold here refers to a reference value of the rate of variation of the brightness, and is obtained by way of experiment. Based on the reference value, a determination is made as to the occurrence of variation in the pitch angle of the oncoming vehicle 200. For example, the threshold may be about 20 cd/$m^2$.

If the difference between the maximum luminances is less than the threshold (NO at S340), control is immediately transferred to S360. If the difference between the maximum luminances is equal to or more than the threshold (YES at S340), there is a probability that the light source is originated from a vehicle, and the amplitude counter is incremented (S350). Then, the number of pixels (the area) configuring the light source is counted in each of the selected frames (S360) to calculate the difference in the area of the light source between the frames (S370).

Then, it is determined whether or not the difference is equal to or more than a threshold (S380). The threshold here refers to a value based on which a determination is made as to the occurrence of variation in the pitch angle of the oncoming vehicle 200, and refers to a reference value of the rate of variation in the area of the light source. Specifically, the threshold may be a value that will make the area after variation larger by a factor of two, for example.

If the difference in the area between the frames is less than the threshold (NO at S380), control is immediately transferred to S400. If the difference is equal to or more than the threshold (YES at S380), it is determined that there is a probability that the light source is originated from a vehicle, and thus the area counter is incremented (S390). Subsequently, it is determined whether or not the maximum luminances in all of the frames have been selected (S400).

If any one of the luminances in the frames has not been selected (NO at S400), the maximum luminance in the subsequent frame is selected (S410). In particular, of the two maximum luminances currently being selected, the maximum luminance in the second frame is selected instead of the maximum luminance in the first frame. After completing this process, the processes at S330 and the subsequent steps are repeatedly performed.

On the other hand, if the maximum luminances in all of the frames have been selected (YES at S400), it is determined whether or not the values of the amplitude counter and the area counter are each equal to or more than a threshold (S420 and S430). The threshold here may only have to be set to a natural number. However, considering that the brightness of the headlights of a vehicle frequently varies as described above, two or more numerical values (e.g. five and the like) are set in order to avoid a situation where a light source is erroneously determined as being originated from a vehicle because the brightness of the light source has happened to vary only once.

If the values of the amplitude counter and the area counter are each less than the threshold (NO at S420 or NO at S430), control is immediately transferred to S450.

If the values of the amplitude counter and the area counter are each equal to or more than the threshold (YES at S420 or YES at S430), a vehicle detection flag is set up (S440) and control proceeds to S450. At S450, it is determined whether or not all the light sources have been selected (S450).

If any one of the light sources has not been selected (NO at S450), the subsequent light source is selected (S460) to repeat the process at S160 and the subsequent processes (see FIG. 5). In performing the process at S460, the amplitude counter and the area counter are reset.

If all the light sources have been selected (YES at S450), it is determined whether or not the vehicle detection flag has been set up (S470). If the vehicle detection flag has been set up (YES at S470), the vehicle detection apparatus 10 transmits a command signal to the headlight control apparatus 20 to switch ON the high-beam lamps (S480) to thereby end the light control process. Upon reception of the command signal to switch ON the high-beam lamps, the headlight control apparatus 20 switches ON the high-beam lamps 6. In this case, the low-beam lamps 7 may be switched OFF or may be left being switched ON.

If the vehicle detection flag has not been set up (NO at S470), the vehicle detection apparatus 10 transmits a command signal to the headlight control apparatus 20 to switch ON the low-beam lamps (S490) to thereby end the light control process. Upon reception of the command signal to switch ON the low-beam lamps, the headlight control apparatus 20 switches ON the low-beam lamps 7 and switches OFF the high-beam lamps 6.

[Advantages of the Present Embodiment]

In the light control system 1 that has been described in detail so far, the vehicle detection apparatus 10 detects the oncoming vehicle 200 in the light control process. Upon detection of the oncoming vehicle 200, the direction of the headlights is changed downward to restrict the illumination range to a range smaller than when no oncoming vehicle 200 is detected. In detecting the oncoming vehicle 200, the vehicle detection apparatus 10 repeatedly detects the brightness or area of every light source in the acquired images to detect a variable light source whose brightness or area has varied to the brightness or area corresponding to a predetermined reference value or more within a reference time. When such a variable light source has been detected, it is determined that a vehicle is present in the acquired image.

Such a light control system 1 enables discrimination between light originating from a vehicle and light originating from an object other than vehicles to thereby properly detect vehicles. Thus, when a vehicle has been detected, the direction of the headlights can be changed downward to restrict the illumination range.

The vehicle detection apparatus 10 is adapted to specify the brightness of each of the pixels configuring an acquired image, and to utilize the brightness of the pixels to detect the brightness of the light source. In specifying the brightness of each of the pixels configuring the acquired image, consideration is given to the brightness of a specific pixel, per se, that is the pixel whose brightness is to be specified, as well as the brightness of the adjacent pixels, i.e. a plurality of pixels adjacent to the specific pixel, whereby the brightness of the specific pixel is specified.

The vehicle detection apparatus 10 specifies the brightness of a specific element taking into account of the brightness of a plurality of pixels including the plurality of adjacent pixels. Therefore, even when an imaged small light source is located over a plurality of pixels, the brightness of the light source can be accurately detected. In other words, brightness can be accurately detected for a light source located in the distance from the camera 5.

Further, the vehicle detection apparatus 10 counts up the number of times of detection of the same single variable light source, and only when the number of times of detection is equal to or more than a set threshold of the number of times, which is two or more, determines a vehicle as being present.

The vehicle detection apparatus 10 determines a light source as being originated from a vehicle when the number of times of detection of a variable light source is equal to or more than the threshold. Therefore, those light sources, whose brightness has happened to vary only once, can be prevented from being erroneously determined as being originated from vehicles.

Other Embodiments

The present invention is not limited to the embodiment described above, but may be variably implemented as far as the implementations fall within the technical scope of the present invention.

For example, in the above embodiment, controlling the switch-ON/OFF of the high-beam lamps 6 has changed the illumination range of the headlights. As an alternative to this, the illumination range may be changed by changing the direction of the optical axis of the low-beam lamps 7.

In the above embodiment, the amplitude counter or the area counter has been ensured to be incremented when the brightness (luminance value) or area of the light source has varied (has increased or decreased) by a value equal to or more than a threshold. Alternatively, a modified light control process shown in FIG. 8 may be performed, so that the amplitude counter or the area counter is incremented when it has been detected that the luminance value or the area has increased by a value equal to or more than a threshold and has decreased thereafter.

In the modified light control process (FIG. 8), the processes at S610 to S630 and S650 to S660 correspond to the variation detecting means of the present invention, and the processes at S640, S670 and S680 correspond to the determining means.

Figure 8:
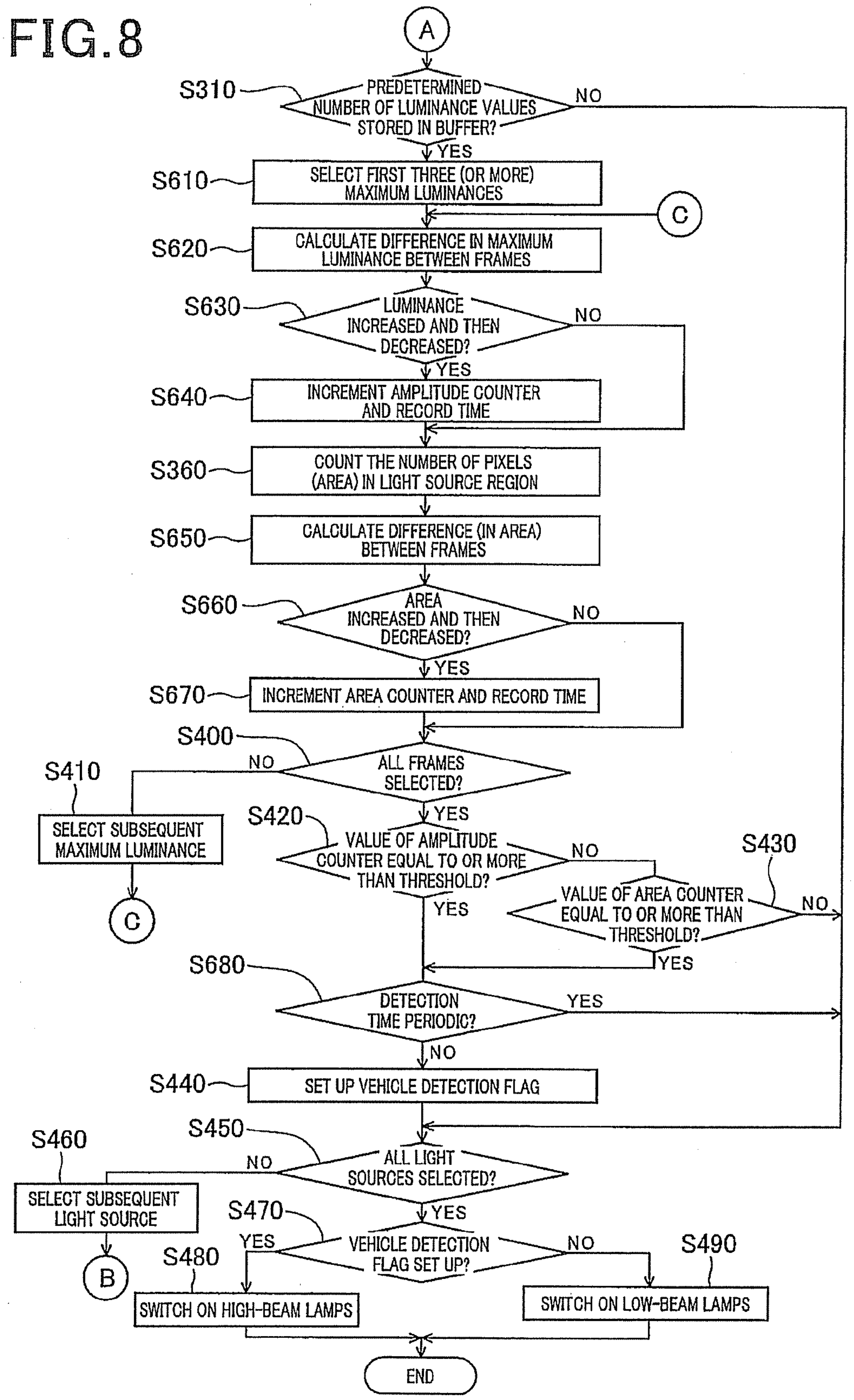
FIG. 8 shows a flow diagram illustrating a light control process of a modification of the present invention.

In the modified light control process, the processes at S320 and S330 shown in FIG. 6 are replaced, as shown in FIG. 8, by the step of selecting the maximum luminances of any three (e.g. the first three) frames or more (S610) and the steps of calculating the differences in the maximum luminance and the area between the frames (S620 and S650). Then, the processes at S340 and S380 are replaced by the steps of determining whether or not there is a light source whose luminance value or area has increased to the threshold or more and decreased thereafter (S630 and S660).

Light originating from a vehicle may instantly increase its brightness (luminance value or area) and then may be restored to its original brightness, due to the bumpy movement, or the like, of the vehicle. The vehicle detection apparatus 10 is able to determine such a light source as being originated from a vehicle. In other words, if the brightness of a light source is increased or decreased and then kept as it is, the vehicle detection apparatus 10 determines the light source as not being originated from a vehicle. In this way, the accuracy of detecting vehicles can be enhanced.

Alternatively, the vehicle detection apparatus 10 may be so configured that intervals between detections are measured in respect of the same single variable light source whose brightness or area varies, and that, if the intervals are regular, the light source is determined as not being originated from a vehicle. Specifically, as shown in FIG. 8, in incrementing the amplitude counter or the area counter, the time of image acquisition of the camera 5 may be ensured to be recorded for frame in which variation in the brightness or area has been detected (S640 and S670), to determine whether or not the brightness variation is periodic (S680).

If the brightness variation is not periodic (NO at S680), a vehicle detection flag is set up to indicate the light source in question is associated with a vehicle (S440). If the time arrives periodically (YES at S680), the light source is determined as not originated from a vehicle, and control proceeds to S450.

Thus, the vehicle detection apparatus 10 is able to exclude those light sources, such as rotating lamps, flashing traffic signals and search lights, whose brightness periodically changes, as not being originated from vehicles. In this way, the accuracy of detecting vehicles can be enhanced.

What is claimed is:

1. A vehicle detection apparatus that detects vehicles during hours of darkness, the apparatus comprising:

an image acquisition unit that repeatedly acquires an image of a road;

a light source detection unit that detects one or more light sources which are an order of magnitude more than a predetermined brightness from each acquired image;

a variation detecting unit that repeatedly detects a brightness of each light and an area occupied by, each of the one or more detected light sources within the total area of each acquired image, and determines that a given detected light source is a variable brightness light source if the brightness of that light source is changed within a reference time beyond a predetermined brightness variation reference value and determines that a given detected light source is a variable area light source if the area occupied by that light source is changed within a reference time beyond a predetermined area variation reference value; and a determining unit that counts the number of times a given detected light source is determined to be a variable brightness light source and the number of times the given detected light source is determined to be a variable area light source, and determines whether a vehicle exists in the acquired image based on the number of times that the given detected light source is determined to be the variable brightness light source and the number of times that the given detected light source is determined to be the variable area light source; wherein, the determining unit determines that the vehicle exists only when the number of times for the given detected light source that the variable brightness is detected is more than a first threshold of the number of times and the number of times for the given detected light source that the variable area is detected is more than a second threshold of the number of times.

2. A vehicle detection apparatus according to claim 1, wherein, the variation detecting unit classifies a given detected light source as a variable brightness light source or as a variable area light source when the brightness or area respectively increases by more than a threshold within a reference time, and then the brightness or area respectively decreases thereafter.

3. A vehicle detection apparatus according to claim 1, wherein, the variation detecting unit calculates the brightness of each pixel that constitutes a given acquired image, and is configured so that the brightness of a given detected light source is calculated using the brightness of each pixel when the variation detecting unit calculates the brightness of each pixel, wherein the brightness of a specific pixel is calculated in consideration of the brightness of the specific pixel itself, and the brightness of adjacent pixels.

4. A vehicle detection apparatus according to claim 1, wherein, the determining unit measures, for a given detected light source, intervals between when the variation detecting unit determines variability of the brightness and intervals between when the variation detecting unit determines variability of the area, and determines that the given detected light source is not from a vehicle if the intervals between determinations are periodic.

5. A vehicle detection apparatus according to claim 1, wherein, there is provided a program stored on a computer readable non-transient memory for configuring a computer to provide each unit of the vehicle detection apparatus.

6. A vehicle detection apparatus according to claim 1, further comprising:

a light control apparatus controlling an optical axis of headlights in the vehicle, and a changing unit that changes an illumination angle of at least one of the headlights downward when the oncoming vehicles are detected.

* * * * *

UNITED STATES PATENT AND TRADEMARK OFFICE

CERTIFICATE OF CORRECTION

PATENT NO. : 8,232,895 B2
APPLICATION NO. : 12/587552
DATED : July 31, 2012
INVENTOR(S) : Takahiro Kamioka It is certified that error appears in the above-identified patent and that said Letters Patent is hereby corrected as shown below:

Col. 11, line 62, claim 1, delete "each light"

Signed and Sealed this
First Day of January, 2013

David J. Kappos
*Director of the United States Patent and Trademark Office*